United States Patent Office 2,875,634
Patented Mar. 3, 1959

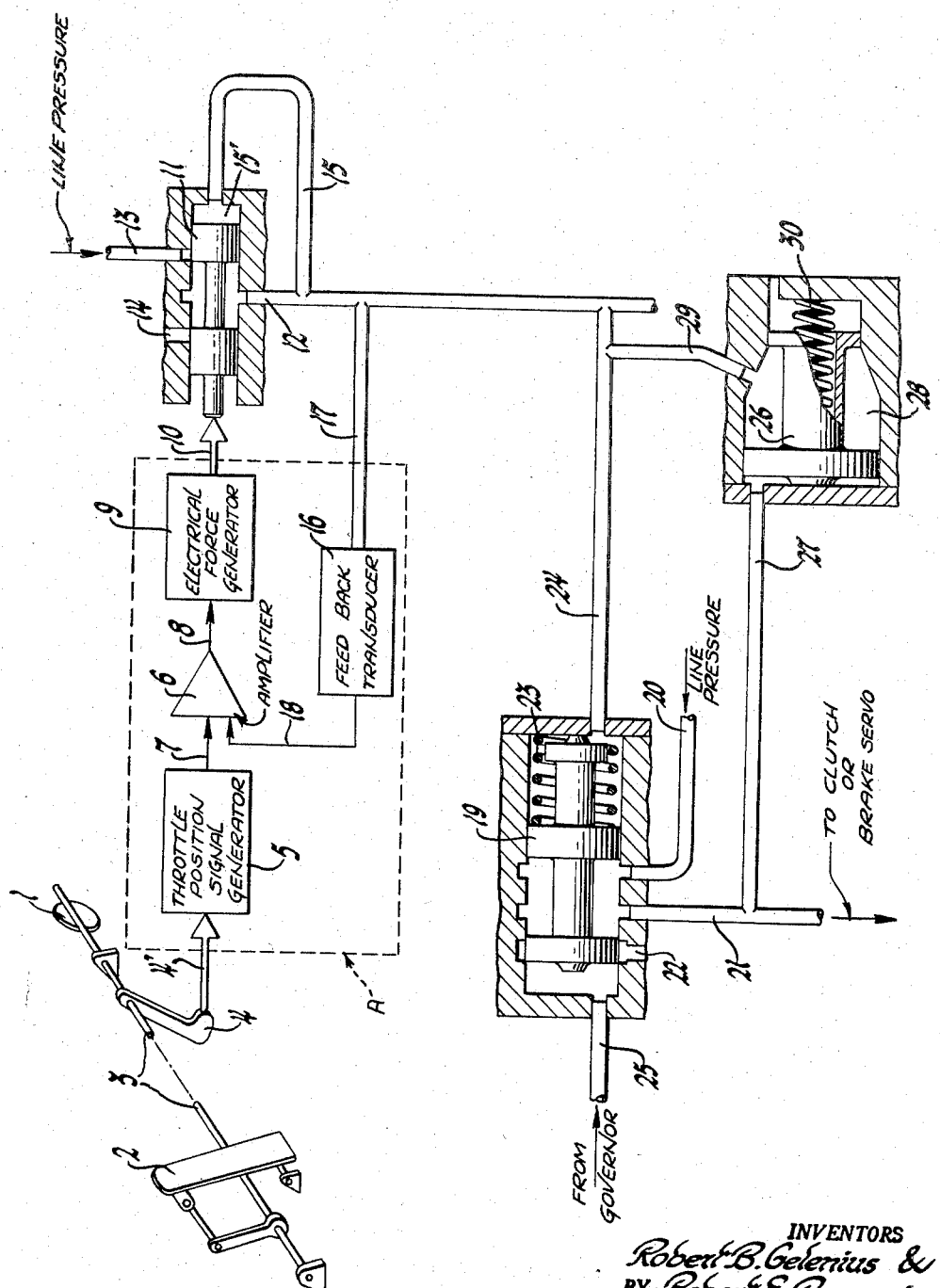

2,875,634

ELECTRICAL AND HYDRAULIC TRANSMISSION CONTROL SYSTEMS

Robert B. Gelenius and Robert E. Resseguie, Flint, Mich., assignors to General Motors Corporation, Detroit, Mich., a corporation of Delaware Application October 8, 1956, Serial No. 614,537

5 Claims. (Cl. 74—472)

This invention is applicable to automotive transmissions used in vehicles powered by internal combustion engines of the spark or combustion ignition piston type or of the gas turbine type. The principles of the invention may also be applied to transmission controls in other than automotive fields.

Automatic transmissions used in motor vehicles generally require some manual control or overcontrol. The transmissions are located at varying distances from the vehicle operator and therefore some form of remote control from the vehicle operator to the transmission is necessary. Particularly the transmissions are controlled by some device responsive to the operator's control of the engine as by the throttle. This control in many cases must be a continuously varying control with reasonably instant and accurate response. The use of mechanical linkages has been almost universal for this but such linkages present various problems. The original linkage must be accurately made and calibrated, any wear in the linkage must be compensated by adjustment or more effectively by replacement of parts. The further the transmission is moved away from the operator the more the problems are multiplied.

It is therefore an object of this invention to provide a remote control for a transmission that minimizes or eliminates the necessity of mechanical linkages between the driver operated control member and the transmission.

A further object of the invention is to provide an electrical link between the driver control and the transmission.

A still further object is to provide an electrical control that is self correcting, i. e. is not sensitive to operational errors. These and other objects and advantages of the present invention will be apparent from the following description, reference being had to the accompanying drawing wherein a preferred form of the present invention is clearly shown.

The drawing is a diagrammatic showing of one form of the invention, certain parts of a transmission control system being shown in detail and certain parts schematically.

The invention generally involves using the movable engine fuel control such as throttle, injector rack, combustion chamber fuel feed, etc. to operate an electrical signal generator that produces a signal varying with the position of the fuel control. This signal is fed to an amplifier where it is increased sufficiently to drive an electrical force generator or converter. The force from the latter which is a mechanical force, acts on a pressure varying valve that controls the pressure of fluid acting on certain pressure responsive elements of the transmission control system. A feedback signal is sent to the amplifier from a transducer that produces a signal varying with the pressure from the pressure varying valve.

Referring in more detail to the drawings 1 represents a butterfly valve in an engine carburetor although it could be any other means used to control the supply of fuel to an internal combustion engine. A throttle control pedal 2 operates a shaft 3 that rotates the butterfly valve 1 and at the same time operates a lever 4. The position of lever 4 is converted to a force that varies with the position by means of an electrical system shown diagrammatically at A. A throttle position signal generator which in the preferred form is a potentiometer but could be any other device utilizing a movable member to vary inductance, capacitance or resistance in an electrical circuit. The signal generator or potentiometer produces a signal represented by arrow 7 that varies with the position of the element 4 represented by the arrow 4'. The element 5 could also be a selsyn transmitter.

The electrical signal 7 from the potentiometer 5 is fed into a single stage transistor amplifier 6 but which may be of multiple stage type or might use vacuum tubes. The amplifier output signal represented by arrow 8 is fed into an electrical force generator 9, which in the preferred form is a solenoid, but which may be any device that converts an electrical signal into a mechanical force such as a selsyn receiver, or rotary motor, etc.

The solenoid force represented by arrow 10 acts on a pressure regulating or metering valve 11 which alternatively connects an output conduit 12 with a supply passage 13 or exhaust passage 14. The supply passage 13 is connected to any suitable source of pressure and in the preferred embodiment would be connected to the main line pressure source of the transmission control system. The output passage 12 is connected at one end to a chamber 15' on the end of the valve opposite the force 10 by means of a conduit 15 so that force 10 acting to move the valve to a position connecting passages 12 and 13 is resisted by the pressure existing in conduit 12 acting on the valve in chamber 15'. It will thus be seen that the pressure in conduit 12 will vary with the force 10, the valve 11 moving to maintain a balance of forces acting on the valve.

A feedback transducer 16 is shown diagrammatically in the figure and may be any device that produces an electrical signal varying with fluid pressure. The preferred form is a simple carbon pile resistor type transducer that has a change resistance with change in pressure. However capacity or inductance type transducers may be used. The transducer is connected by passage 17 to the output passage 12. Thus, the regulated or modulated pressure in passage 12 acts on the feedback transducer 16 which generates a signal represented by arrow 18 that is fed into the amplifier 6. The two signals 7 and 18 fed into the amplifier 6 are arranged so that if the value of the pressure in conduit 12 builds up faster than what is called for by signal generator 5, the input signals 7 and 18 tend to cancel each other thereby reducing the amplifier output signal 8 and reducing the mechanical force 10 acting on the valve 11. If the regulated pressure in conduit 12 builds up too slowly, the signals 7 and 18 will increase the signal 8 to increase the force 10 thereby moving the valve 11 to increase the pressure in conduit 12. With the use of the feedback transducer errors in the amplifier 6, the force generator 9 and the valve 11 are compensated for, thus ensuring that the pressure existing in the conduit 12 will instantly and accurately vary with the position of the accelerator pedal 2.

The pressure from valve 11 in conduit 12 which may be termed throttle pressure, as it changes with the position on the throttle valve 1, can be used to control any number of elements in an automatic transmission. For example, the invention could be used in the transmission control system shown and described in application S. N. 477,832, Borman et al., filed December 27, 1954. In the embodiment shown in the figure the pressure is shown connected to a ratio selecting shift valve 19. The shift valve 19 is of conventional type utilized in automatic transmissions and acts as an on-off valve for the supply of fluid under pressure to pressure operated servos such as clutches or brake servos used to control the ratio of the transmission. The operation of the shift valve is conventional and as shown in the figure a supply line 20 which is connected to a supply of fluid under pressure and which may be the main line pressure of the transmission control system, is connected to an output conduit 21 when the valve is in its upshifted position as shown in the figure. The valve connects the output passage 21, leading to the clutch or brake servo, to an exhaust passage 22 when the valve is in its downshifted position (left hand position as viewed in the figure). A spring 23 acts to normally hold the valve in its left hand or downshift position and the force of the spring 23 is aided by the regulated throttle pressure in conduit 12 connected to act on the right hand end of the valve 19 through passage 24. The left hand end of the shift valve 19 is acted on by a governor controlled fluid pressure from passage 25. This governor pressure may be from any type of conventional transmission governor which produces a fluid pressure varying with the speed of rotation of some element of the transmission. Thus, in a conventional manner the valve 19 is controlled by the pressures existing in passages 25 and 24.

A second use for the regulated throttle pressure existing in passage 12 is shown on the figure. An accumulator piston 26 acts on a cylinder and is moved to the righ as seen in the drawing by pressure in passage 27 which is connected to conduit 21 that leads to the clutch or brake servos. Movement of the accumulator piston 26 is resisted by throttle pressure in chamber 28 which is supplied through a conduit 29. A spring 30 also acts on the accumulator piston 26. In a conventional manner the build up of pressure in passage 21 feeding a clutch or brake servo is controlled by the accumulator 26, the build up in pressure being regulated according to the pressure existing in chamber 28 which is varied by the throttle regulator valve 11 which in turn is controlled through the electrical linkage by the accelerator pedal 2.

The regulated throttle pressure in conduit 12 can be conneced to other control devices such as other shift valves, pressure regulating valves and other control devices wherein the regulated throttle pressure is or can be used as a controlling means.

The amplifier of the preferred embodiment could in some cases be eliminated if some form of signal mixer were inserted between the signal generator 5 and the force generator 9 that acted to combine the signals from the generator 5 and the transducer 16 to vary the effect of the signal 7 in producing the force 10. If a selsyn system were employed, the amplifier could be eliminated if the transducer were connected to establish a phase shift in the selsyn circuit.

The invention provides an improved control apparatus suitable for use in many application in the art of remote transmission control and the principles of the invention may easily be utilized in other arts through the use of ordinary skill.

It will be apparent to those skilled in the art that many modifications of the system and components thereof may be made within the scope of the invention which is not to be considered as limited by the detailed description of the preferred embodiment described and shown.

What is claimed is:

1. In a control system for an automatic transmission having pressure-responsive devices for controlling the transmission, means for supplying a regulated pressure to the devices including, a source of fluid under pressure, a force-responsive valve connected to the source and to the devices for regulating the pressure from said source to the devices according to the force acting in the valve, a manual control member, a signal generator connected to the manual member for producing an electrical signal varying with the position of the manual member, a signal amplifier connected to said signal generator for amplifying the signal from said generator, a force generator connected to receive the amplified signal from said amplifier for producing a mechanical force varying with said amplified signal, means connected to said force generator and said valve for transmitting said mechanical force to said valve, and feedback transducer means connected to said valve and said amplifier for supplying an electrical signal to said amplifier according to the pressure supplied to said devices.

2. In a control system for an engine-driven transmission having fluid pressure-responsive devices for controlling the transmission, means for supplying a modulated fluid pressure to the devices including a movable member for controlling the engine, means responsive to the position of the movable member for producing an electrical signal varying with the member position, means for amplifying said signal, means for converting the amplified signal to a mechanical force, valve means responsive to said mechanical force for supplying a pressure to said devices varying with said mechanical force, and transducer means for supplying an electrical signal to said amplifying means varying with the pressure supplied by said valve to said devices.

3. In a control system for an engine-driven transmission including ratio-controlling means responsive to a fluid under varying pressure, means for varying the pressure including a manual control for said engine, means responsive to the position of said manual control for generating an electrical signal varying with said position, means for amplifying said signal, means for converting said amplified signal to a mechanical force varying with the amplified signal, valve means connected to receive said mechanical force adapted to supply a variable pressure to the ratio-controlling means in accordance with the amplified signal variaton.

4. In a control system for a transmission including fluid pressure-responsive devices for controlling the transmission, movable control means, means responsive to movement of said control means for producing an electrical signal, an electrical amplifier having an input and an output, said input connected to receive said signal, said output providing an amplified signal varying with said input, means for converting said output signal to a mechanical force, pressure-controlling means for varying a fluid pressure in response to variations in said force, means responsive to said varying fluid pressure for supplying an additional electrical signal to said amplifier input for varying the output signal of said amplifier with respect to the input signal, and means for connecting varied fluid pressure from said pressure-controlling means to the fluid pressure-responsive devices.

5. In a control system for a transmission including a fluid pressure-responsive device for controlling the transmission, movable control means, means responsive to movement of said control means for producing a first electrical signal varying with movement of said control means, converter means for converting said electrical signal to a mechanical force, means for electrically connecting said movement responsive means to said converter means, pressure-controlling means for varying a fluid pressure in response to variations in said force, means responsive to said varying fluid pressure for supplying an additional electrical signal to said connecting means for varying the effect of said first signal on said converter means, and means for connecting the varied fluid pressure from said pressure-controlling means to the fluid pressure-sponsive device.

References Cited in the file of this patent

UNITED STATES PATENTS

| | | |
|---|---|---|
| 2,606,456 | Dodge | Aug. 12, 1952 |
| 2,640,373 | Jandasek | June 2, 1953 |
| 2,737,824 | Livermore | Mar. 13, 1956 |
| 2,770,148 | Wayman | Nov. 13, 1956 |